(12) United States Patent
Gawith et al.

(10) Patent No.: US 8,054,536 B2
(45) Date of Patent: Nov. 8, 2011

(54) ELECTRIC FIELD POLING OF FERROELECTRIC MATERIALS

(75) Inventors: Corin Barry Edmund Gawith, Southampton (GB); Huw Edward Major, Southampton (GB); Lu Ming, Southampton (GB); Peter George Robin Smith, Southampton (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 12/664,193

(22) PCT Filed: Jun. 11, 2008

(86) PCT No.: PCT/GB2008/001993
§ 371 (c)(1),
(2), (4) Date: Oct. 18, 2010

(87) PCT Pub. No.: WO2008/152377
PCT Pub. Date: Dec. 18, 2008

(65) Prior Publication Data
US 2011/0032597 A1    Feb. 10, 2011

(30) Foreign Application Priority Data

Jun. 11, 2007   (GB) .................................. 0711275.8

(51) Int. Cl.
*G02F 1/355* (2006.01)
*G02F 1/09* (2006.01)

(52) U.S. Cl. ......... 359/326; 359/280; 359/282; 385/122

(58) Field of Classification Search ................... 359/280, 359/282, 326–332; 385/122; 372/21–22
See application file for complete search history.

(56) References Cited

U.S. PATENT DOCUMENTS

| | | | | |
|---|---|---|---|---|
| 6,156,255 | A * | 12/2000 | Byer et al. | 264/406 |
| 6,800,238 | B1 | 10/2004 | Miller | |
| 6,952,307 | B2 * | 10/2005 | Apostolopoulos et al. | 359/321 |
| 2008/0218846 | A1 * | 9/2008 | Chu et al. | 359/326 |

FOREIGN PATENT DOCUMENTS

EP        1801644        6/2007
(Continued)

OTHER PUBLICATIONS

International Search Report and Written Opinion for corresponding application No. PCT/GB2008/001993 dated Aug. 28, 2008.

(Continued)

*Primary Examiner* — Daniel Petkovsek
(74) *Attorney, Agent, or Firm* — Renner Otto Boisselle & Sklar, LLP

(57) ABSTRACT

A method of inducing a periodic variation of nonlinearity value in a sample of ferroelectric material comprises arranging a pair of electrodes on opposite faces of the sample, one electrode defining a desired pattern of nonlinearity variation, applying a pre-bias voltage across the sample for a predetermined time using the electrodes, the pre-bias voltage being less than the coercive field of the ferroelectric material; and after the predetermined time, applying a current-controlled poling voltage across the sample using the electrodes, to produce domain inversion in the sample according to the desired pattern of nonlinearity variation. The pre-bias voltage may be 75% of the coercive field or more, and applied for a pre-determined time between 1 and 100 seconds.

22 Claims, 2 Drawing Sheets

FOREIGN PATENT DOCUMENTS

WO      03/003111       1/2003
WO      2006/041176     4/2006

OTHER PUBLICATIONS

United Kingdom Search Report for corresponding application No. GB0711275.8 dated Sep. 6, 2007.

Busacca et al., "Surface periodic poling in lithium niobate and lithium tantalate", Fibres and Optical Passive Components, 2005, pp. 126-130.

Yazdani et al., "Ferroelectric domain inversion in congruent lithium niobate", Microwave and Optoelectronics Conference, 2003, pp. 453-458.

Myers et al., "Quasi-phase-matched Optical Parametric Oscillators in Bulk Periodically Poled LINB03", Journal of the Optical Society of America, 1995, pp. 2102-2116.

Yamada et al., "First-order Quasi-phase-matched LINB03 Waveguide Periodically Poled by Applying an External Field for Efficient Blue Second-Harmonic Generation", Applied Physics Letter, 1993, pp. 435-436.

* cited by examiner

ELECTRIC FIELD POLING OF FERROELECTRIC MATERIALS

This application is a national phase of International Application No. PCT/GB2008/001993 filed Jun. 11, 2008 and published in the English language.

BACKGROUND OF THE INVENTION

The present invention relates to an improved method for electric field poling of ferroelectric materials and apparatus for carrying out such a method.

Nonlinear optical devices are proving very useful in the field of optics for converting laser light between different wavelengths. Examples of conversion include second harmonic generation in which two photons combine to create a new photon at twice the frequency (half the wavelength), and optical parametric generation in which a single photon splits into two photons at longer wavelengths. In general, such processes must conserve photon energy and must be phase-matched to achieve useful efficiencies. The requirement for phase-matching is that the phase velocities of the interacting waves in the nonlinear material must be equal. One phase-matching technique makes use of birefringence in a crystalline material to achieve efficient interaction. An alternative technique is based on the concept of quasi-phasematching (QPM) in which the difference in phase velocities of the interacting waves is compensated by a periodic reversal of the nonlinear coefficient of the crystal. This periodic reversal can be achieved by many techniques, the most common of which uses an approach known as periodic poling, in which a high voltage pulse is applied to a ferroelectric material using a patterned electrode to create a corresponding pattern of domain reversals.

Many published periodic poling methods are based on that described in U.S. Pat. No. 5,193,023. This method uses a pair of electrodes formed on opposite major surfaces of a ferroelectric substrate, one of which is patterned according to the desired domain reversal pattern, for application of a DC voltage across the substrate to create a pattern of or opposite polarisation direction. To produce domain inversion, the voltage must exceed the so-called coercive voltage for the ferroelectric material being used. Furthermore, for this method, the voltage is to be a pre-determined DC voltage or predetermined voltage pulse.

To implement this method, it is necessary to know in advance the voltage that both produces poling but prevents catastrophic breakdown. This can be difficult, because the electrical and physical characteristics of the actual crystal in use are often not known well so there is a significant element of guess work in determining the voltage characteristics. Furthermore, when working with samples cut from a larger wafer, the properties may vary from sample to sample as composition or thickness varies across the wafer, making it necessary to change the voltage for every sample.

The method is widely used, however, and it is common practise to set up such voltage controlled poling by using a voltage programmed source and a large resistor in series with the crystal to be poled. A voltage somewhat larger than the coercive voltage is applied, with the resistor acting to limit the current. However, this technique results in limitation as the large resistor sets up a large time constant (together with the capacitance of the sample). Thus precise control is difficult to achieve, and the poling proceeds at a rate set by the coercive field of the sample, the series resistor and the programmed high voltage.

A later-developed poling technique uses control of current rather than voltage. The poling apparatus uses feedback to give a desired current shape by dynamic variation of voltage, which overcomes many drawbacks of the approach taught in U.S. Pat. No. 5,193,023 as it no longer requires a guess to be made as to the best poling voltage. Furthermore, it allows considerable control of the poling dynamic. Domain switching causes a displacement current which equals the current in the external poling circuit; thus the technique controls the rate of domain switching directly. The method also helps to recover from electrical breakdown events by limiting voltage to prevent high currents, in turn leading to improved yield.

Current-controlled poling has been described in many publications, for example U.S. Pat. No. 6,952,307. However, while disadvantages of the original voltage-controlled poling method are overcome, the approach of merely controlling the current does not necessarily lead to good results.

SUMMARY OF THE INVENTION

Accordingly, a first aspect of the present invention is directed to a method of inducing a periodic variation of nonlinearity value in a sample of ferroelectric material, comprising: arranging a pair of electrodes on opposite faces of the sample; one electrode defining a desired pattern of nonlinearity variation; applying a pre-bias voltage across the sample for a predetermined time using the electrodes, the pre-bias voltage being less than the coercive field of the ferroelectric material; and after the predetermined time, applying a current-controlled poling voltage across the sample using the electrodes, to produce domain inversion in the sample according to the desired pattern of nonlinearity variation.

The method addresses the problem with conventional controlled voltage poling techniques of needing to know in advance the characteristics of the particular sample to determine a pre-known voltage to apply across the sample, by utilising a controlled current approach. It then further addresses problems with conventional current controlled poling by adding a pre-bias voltage that is applied to the sample before the poling process. Without a pre-bias voltage, the poling quality obtainable by controlled current techniques is poor. According to the invention, the pre-bias stabilises the sample at a voltage close to the coercive field before poling, which reduces the voltage increase that occurs when the poling current is initiated and the voltage has to rise to be larger than the coercive field. The voltage during poling is thereby much better defined, and the amount of charge delivered to the sample to produce domain inversion can be accurately controlled, giving greatly improved poling quality.

Any pre-bias voltage will give some enhancement over no pre-bias voltage, but the closer the pre-bias voltage is to the coercive field, the better the results. Therefore, embodiments of the invention propose that the pre-bias voltage is greater than 75% of the coercive field of the ferroelectric material, the pre-bias voltage is greater than 90% of the coercive field of the ferroelectric material, the pre-bias voltage is greater than 95% of the coercive field of the ferroelectric material, or the pre-bias voltage is greater than 99% of the coercive field of ferroelectric material.

The predetermined time for which the pre-bias voltage is applied may be in the range of 1 to 100 seconds inclusive.

The sample may have a thickness perpendicular to the faces to which the electrodes are applied that is in the range 150 µm to 10 mm inclusive.

The voltages may be applied using a current-controlled high voltage power supply, with a resistor arranged in parallel to the sample. This is a particularly simple arrangement for implementing the two voltage application steps. The current-controlled high voltage power supply provides the required control of the current for application of the poling voltage, and the resistor allows the pre-bias voltage to be applied across the sample while the resulting current flows through the resistor so that no charge is delivered to the sample that would interfere with the later poling process.

The resistor may have a resistance of at least 1 MΩ. The size of the resistor can be selected with reference to the desired level of pre-bias voltage and the amount of resulting current through the resistor that is deemed acceptable or appropriate.

The current-controlled high voltage power supply may be programmed to deliver current during the application of the poling voltage according to a poling curve that provides a sufficient amount of charge to produce a required amount of domain inversion. In addition, the poling curve may be configured to correct for current flowing through the resistor, so that the resistor current does not detract from the charge to be delivered to the sample.

A second aspect of the invention is directed to apparatus configured to implement a method according to the first aspect.

A third aspect of the present invention is directed to apparatus for inducing a periodic variation of nonlinearity value in a sample of ferroelectric material, comprising: a voltage source operable to apply a pre-bias voltage across the sample for a predetermined time, using a pair of electrodes arranged on opposite faces of sample with one electrode defining a desired pattern of nonlinearity variation, the pre-bias voltage being less than the coercive field of the ferroelectric material; and a voltage source operable to apply a current-controlled poling voltage across the sample after the predetermined time, using the electrodes, to produce domain inversion in the sample according to the desired pattern of nonlinearity variation.

The pre-bias voltage may be greater than 75% of the coercive field of the ferroelectric material, or greater than 90% of the coercive field of the ferroelectric material, or greater than 95% of the coercive field of the ferroelectric material, or greater than 99% of the coercive field of the ferroelectric material. The pre-bias voltage may be applied for a predetermined time in the range of 1 to 100 seconds inclusive.

In some embodiments, the apparatus may comprise a single current-controlled high voltage power supply operable to apply the pre-bias voltage and the poling voltage, and programmed to provide currents corresponding to the pre-bias voltage and the poling voltage; and a resistor arrangeable in parallel to the sample. The resistor may have a resistance of at least 1 MΩ.

The current-controlled high voltage power supply may be programmed to deliver current during the application of the poling voltage according to a poling curve that provides a sufficient amount of charge to produce a required amount of domain inversion. The poling curve may be configured to correct for current flowing through the resistor.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
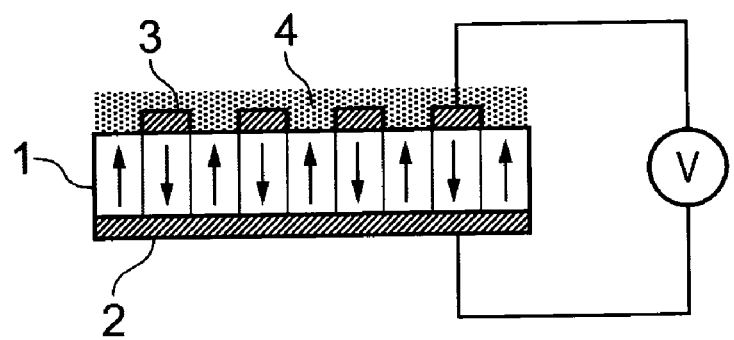
FIG. 1 shows a schematic representation of an example arrangement illustrating the general principles of electric field periodic poling of ferroelectric substrates.

FIG. 1 is a simplified schematic representation of a ferroelectric substrate or wafer that has undergone periodic poling by application of an electric field, to illustrate the general principle of the technique. The substrate 1 has an electrode 2 continuously covering its lower face, and a patterned electrode 3 on its upper face. The patterned electrode 3 is configured as a plurality of parallel bands or stripes having widths and a mark-to-space ratio that correspond to the desired domain inversion spacing for the final poled crystal. A layer of insulating material 4 (liquid, gas, vacuum or photoresist, for example) overlays the patterned electrode to protect the substrate between the electrode stripes. A voltage V is applied across the substrate 1 using the electrodes 2, 3. Reversal of the ferroelectric domains occurs when the applied electric field exceeds the so-called coercive field for that ferroelectric material (being a property of the material). The patterning of the upper electrode 3 means that reversal only occurs under the electrode stripes, and not under the insulated region, giving a periodic domain reversal or variation of the nonlinearity coefficient across the substrate. In FIG. 1, this is indicated by the arrows in the substrate, which has been poled sufficiently to achieve 180° domains extending through the full depth of the substrate. The degree of poling achieved depends on the amount of charge delivered by the current flowing as a result of the applied electric field, so it is necessary to determine how much charge needs to be provided to produce the desired quality of poling. For a given sample, the required charge is related to the conductive area defined by the patterned electrode. The amount of charge can be varied by adjustment of the applied voltage, the current, or both. Good control of the charge is important for achieving good quality poled material.

Alternative techniques may used to provide the electrodes. In particular, the pattern may be fabricated using insulating photoresist. This may be done by spinning photoresist onto the substrate surface, exposing the photoresist using a mask to define the desired pattern and developing the photoresist to leave the unexposed parts. Hence, an insulating pattern is defined on the substrate, in place of the conducting pattern of the previous example. The conductive electrical contact is then provided over the insulating pattern, using for example a gel or liquid electrode or a metal layer, and similarly for the opposite face of the crystal. Many different techniques for providing suitable electrodes for poling are known; any may be used to implement the present invention.

The upper and lower faces defined for electrical contact will depend on the crystallographic structure of the ferroelectric material being used, and also on the electrode type. For example, materials such as lithium niobate and lithium tantalate will be poled via their z faces, with the −z face typically having the patterned electrode if a liquid or gel electrode is used, and the +z face typically having the patterned electrode for metallic electrodes.

To illustrate the present invention and its advantages, a number of conventional poling techniques will now be described.

Figure 2:
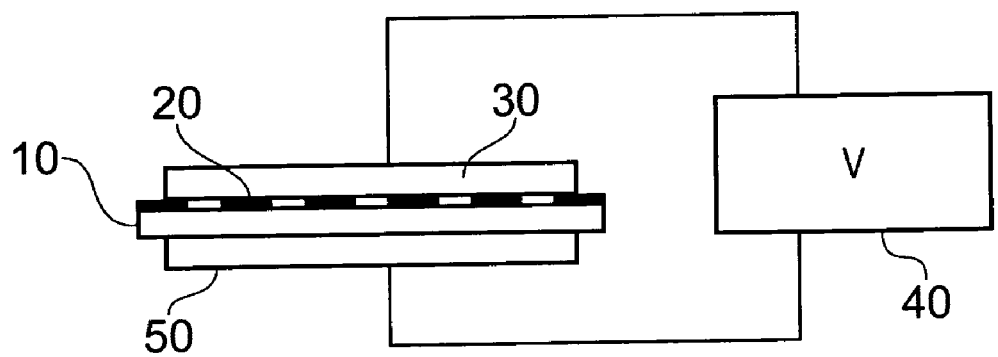
FIG. 2 shows a schematic representation of an idealised controlled voltage technique for periodic poling.

FIG. 2 shows a simplified schematic diagram of a first poling arrangement. A sample 10 of ferroelectric material, in the form of a thin wafer or substrate suitable for optical device fabrication, is provided. The material may optionally be doped with materials such as zinc, magnesium oxide or hafnium to reduce photorefractive damage in the eventual optical device. Furthermore, the wafer material may be of a composition which is congruent or stoichiometric.

The sample 10 is typically a z-cut sample in the form of a plate, with a thickness of around 500 µm. Thinner or thicker substrates may be used, however, with thicknesses up to a few millimeters. The lateral size of the sample is chosen to prevent electrical breakdown occurring around the sample. This may typically require it to be at least 5 mm larger than the desired poled area.

A patterned insulating structure 20 is defined by photolithography on the upper face of the sample 10. It may simply comprise a series of openings in a layer of photoresist. A conductive electrode structure 30 is brought into contact with the patterned structure 20. It may be a deposited metal, or simply a liquid conductor such as lithium chloride solution or a gel conductor, and contacts the sample through the gaps in the insulating pattern. A second, continuous, electrode 50 is arranged over the lower face of the sample 10, typically having the same composition (i.e. metal, gel or liquid) as the upper electrode 30. When using gel electrodes, better results are obtained when the patterned electrode 30 is arranged on the −z face of the sample.

A high voltage source 40 is connected across the electrodes 30, 50 for application of a predetermined poling voltage pulse across the sample, where the poling voltage exceeds the coercive field of the ferroelectric material. The voltage source 40 is programmable, and can be programmed by some external device such as a computer or signal generator (not shown). In this example, the voltage source 40 is an ideal "stiff" voltage source.

This poling apparatus is idealised, both in being difficult to build (as it requires a power supply that can give a particular voltage regardless of load), but also because in use it would be necessary to know the exact voltage which gives the optimal poling. This voltage is a complex (and generally unknowable) function of factors including wafer thickness, previous wafer history, electrode material and electrode pattern. In use, the arrangement of FIG. 2 would involve demanding a particular high voltage waveform from the voltage controlled supply 40 appropriate to achieve a particular poling result.

In contrast to this idealised situation, in conventional controlled voltage poling apparatus it is common to add a series resistor (typically of a few mega-Ohms) to the circuit.

Figure 3:
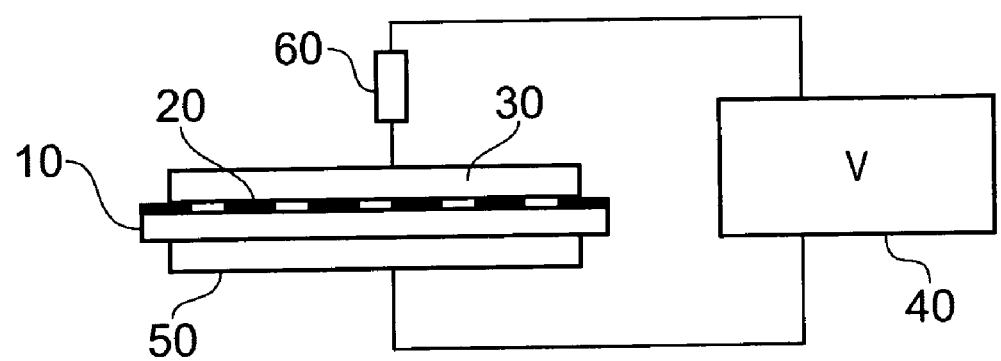
FIG. 3 shows a schematic representation of a controlled voltage technique for periodic poling using a series resistor according to the prior art.

FIG. 3 shows the apparatus of FIG. 2 modified in this way. A resistor 60 is included in series with the sample 10.

In practise a real voltage source 40 will have a finite output impedance, and so a certain small resistance equivalent to the series resistor 60 would effectively exist. However, for conventional poling using apparatus such as that of FIG. 3, the resistor 60 is chosen to have a much larger value than the intrinsic output impedance of the supply, typically between 100 kΩ and 10 MΩ. The poling operation now works as follows. A voltage waveform is demanded from the voltage supply 40, which causes its output voltage to go to a desired voltage (say 12 kV) which exceeds the likely coercive field of the sample 10 (which might be 10.5 kV). The remaining 1.5 kV is then dropped across the resistor 60. If the resistance of the resistor 60 is 10 MΩ, for example, the current through the resistor 60 is determined as usual by V/R, which in this case is 1.5 kV/10 MΩ, or 150 µA. Thus the poling current delivering the charge required for domain inversion is 150 µA.

A drawback of this approach is that the current for poling is determined by the difference in the prescribed voltage and the coercive field. The coercive field is only approximately known for any ferroelectric material, so the current is poorly specified. Furthermore, the large resistance of the resistor R adds a large RC time constant to the circuit, which makes detailed control difficult.

Figure 4:
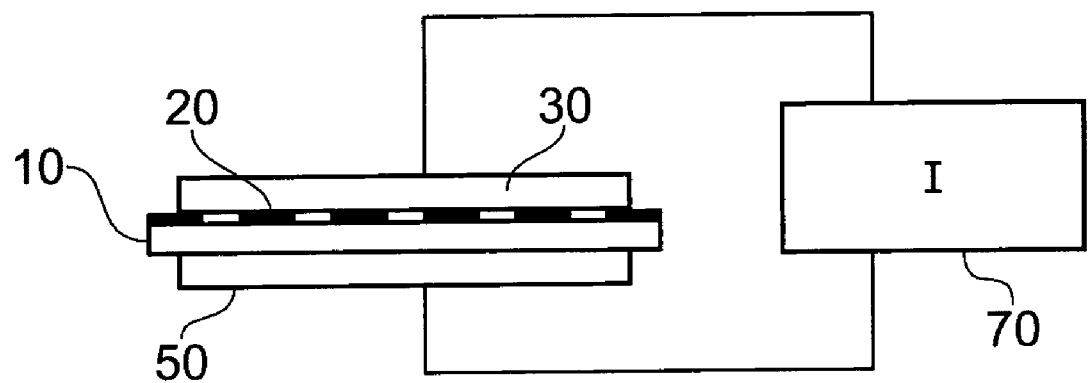
FIG. 4 shows a schematic representation of a controlled current technique for periodic poling according to the prior art.

FIG. 4 shows apparatus for an alternative approach that uses a controlled current in place of the controlled voltage of the apparatus in FIG. 3. In this current controlled poling arrangement, the high voltage source 40 is replaced by a programmable current source 70. Such a source is capable of producing a high voltage output, but is configured to sense the current flowing out of (or back into) its terminals. The source can thus be programmed to give a particular current waveform, and will adjust its voltage appropriately to deliver this current for the attached load. Thus the current through the sample 10 can be precisely specified. The programming can be external, by a PC or a signal generator, for example. The integral of the current curve or profile gives the delivered charge, which in turn determines the amount of poling and the poled area. Optimisation of the current profile can therefore be employed to achieve the best poling quality.

At the start of the current profile, the current will necessarily be zero. However, as soon as current is demanded, the voltage must rise very rapidly to be just slightly higher than the field of the crystal, to allow current to flow through the sample 10. Typically, therefore, the current controlled apparatus of FIG. 4 will give a very rapid rise in voltage immediately upon the demand for current (i.e. when the poling current profile is initiated). Consequently, the voltage in a current controlled poling technique is poorly defined. This is in contrast with the controlled voltage approach of FIGS. 2 and 3, in which the current is poorly defined. With either arrangement, though, precise control of the poling process is difficult, potentially leading to poor poling quality.

The present invention proposes a technique to address these difficulties. As with the approach illustrated in FIG. 4, the poling process is current controlled, so that a specified current profile is programmed from a current source which adjusts the applied voltage accordingly to provide this current. Additionally, however, a voltage is applied prior to poling which is set to be less than, but close to, the coercive field of the ferroelectric material. This avoids the rapid rise in voltage that occurs on the demand for current under the conventional controlled current technique. Hence, the voltage is much better defined during the poling process (when the poling current is flowing), and better control of the poling process and a consequent higher poling quality is achieved. Also, the advantages of current controlled poling over voltage controlled poling are retained, such as the avoidance of the need to be able to predetermine the appropriate voltage.

Any voltage applied across the sample which is less than the coercive field will provide a zero poling current through the sample. This is equivalent to the zero voltage applied before the poling current profile of conventional current controlled poling. However, the present invention proposes to apply a pre-bias voltage that is close to, but lower than, the coercive field value, so that only a small increase in voltage to above the coercive field is needed to commence the poling current supply. This gives greater voltage stability and hence improved control over the poling process, so that the required amount of charge can be provided more exactly. In the foregoing discussion it is recognised that some capacitive currents will flow whenever the voltage across the crystal is altered. Such current is merely capacitative and does not contribute to the poling process.

Any arrangement that can apply the pre-bias voltage across the sample for an appropriate length of time can be used. According to one attractively simple embodiment, a resistor is provided in parallel to the sample, and the pre-bias voltage and the poling current/poling voltage are both supplied from a controlled current high voltage power supply.

Figure 5:
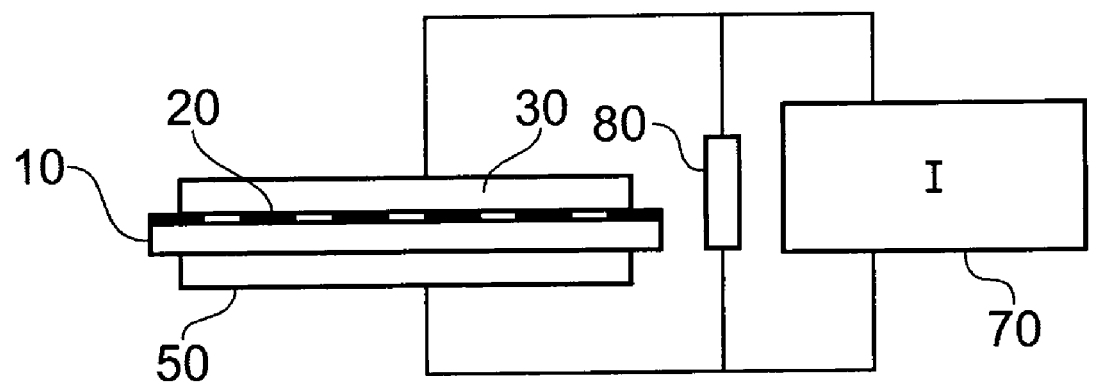
FIG. 5 shows a schematic representation of a periodic poling technique according to an embodiment of the present invention.

FIG. 5 shows apparatus according to this embodiment. The apparatus is the same as that shown in FIG. 4 for a conventional controlled current poling technique, except for the addition of a resistor 80 arranged in parallel with the sample 10.

The controlled current source 70 is programmed or otherwise instructed to provide first a bias current that results in the desired pre-bias voltage being applied across sample for a predetermined time period, and then a poling current profile as for conventional controlled current poling. The source can be controlled by a PC, an industrial controller or a programmable signal generator, for example.

At the start of this process, the programmed current demands a bias current which is set to be I=V/R, where R is the size of the parallel resistor 80 and V is the desired pre-bias voltage, being slightly lower than the anticipated coercive field. The programmed current supply will now increase in voltage to cause this bias current to flow. The voltage across the sample rises to V, but because V is less than the coercive field, substantially all the current flows through the resistor and not through the sample. Therefore, poling does not yet begin, but the voltage across the sample is able to stabilise close to the coercive field. The current program then increases to demand a poling current (plus the bias current) which will result in successful poling by supply of sufficient charge. The compensation of the bias current (i.e. correction to allow for the current flowing through the resistor 80) may readily be made in software; allowing very precise control of the overall charge. Optimisation of the pre-bias voltage may be made by altering the pre-bias current, and the current controlled poling may be similarly optimised. Furthermore, it is possible to deliberately increase or decrease the amount of charge (given by the integral of the programmed current) to slightly overpole or underpole the sample. For example, by slightly overpoling it is possible to increase the uniformity of poling across a large sample.

In summary, therefore, the present invention proposes to carry out periodic poling of ferroelectrics by application of a pre-bias voltage that is close to but lower than the coercive field of the ferroelectric material, followed by supply of a current controlled poling curve with an integrated charge designed to match the desired ferroelectric domain pattern.

The pre-bias voltage is applied for a predetermined period of time. An optimum time may be selected in accordance with the results of experimental trials. Suitable pre-bias parameters will depend on factors including the composition, thickness and type of ferroelectric material used. In the experimental trials a range of times may be tried, and the resulting poled structures reviewed for poling quality, from which a suitable time can be chosen. The time will typically be in the range of 1 second to 100 seconds, but times outside this range may also be appropriate.

The sample of ferroelectric material may be any thickness for which an adequate poling result can be achieved. However, good results are obtained for samples with thicknesses in the range of 150 µm to 10 mm.

As with conventional electric field poling techniques, the present invention is applicable to ferroelectric materials in general. Examples of suitable materials include congruent lithium niobate, congruent lithium tantalate, stoichiometric lithium niobate, stoichiometric lithium tantalate, magnesium oxide-doped lithium niobate, magnesium oxide-doped lithium tantalate, any other doped ferroelectric, $KTiOPO_4$ (KTP), $RTiOAsO_4$ (RTA), $KTiOAsO_4$ (KTA), $RTiOPO_4$ (RTP), mixed rubidium/potassium arsenates and phosphates, $BaMgF_2$, and vapour phase equilibrated lithiuim niobate.

As an example, lithium tantalate wafers have been pulled using the proposed method. The wafers were patterned with aluminium electrodes overlaying photoresist with a period of 6 µm. Poling was carried out using a range of pre-bias voltages and times. A pre-bias voltage of 9.5 kV was applied for 60 seconds, compared to a coercive field of 10.5 kV. This gave fairly poor domain fidelity, with defects including missing domains, domains terminating mid-way across the sample, and large overpoled areas. In contrast, a pre-bias voltage of 10.02 kV for 60 seconds gave good quality uniform domains. Thus, a pre-bias voltage closer to the coercive field value gives improved results. This is to be expected from the fact that the pre-bias voltage aims to reduce the sudden voltage increase to above the coercive field value arising when the poling current begins.

Any value of pre-bias voltage will produce some improvement over the conventional controlled current poling approach. However, the closer the pre-bias voltage is to the coercive field, the better the improvement. Therefore, values of pre-bias voltage that are at least 75% of the coercive field are recommended. More advantageously, however, the pre-bias voltage may be at least 90%, at least 95%, or at least 99% of the coercive field.

It might appear that the issue of applying a pre-bias voltage requires a prior knowledge of the coercive field, to set a pre-bias voltage appropriately close. In practice, the pre-bias voltage only need be defined to within a few hundred volts of the coercive field. Typically the uncertainty in the coercive field is a few tens to a hundred volts, and so the issue of accurately setting a pre-bias voltage is not too critical, and certainly is much less critical than trying to pre-determine the actual poling voltage required for conventional controlled voltage poling.

REFERENCES

[1] U.S. Pat. No. 5,193,023
[2] U.S. Pat. No. 6,952,307

The invention claimed is:
1. A method of inducing a periodic variation of nonlinearity value in a sample of ferroelectric material, comprising:
   arranging a pair of electrodes on opposite faces of the sample, one electrode defining a desired pattern of nonlinearity variation;
   applying a pre-bias voltage across the sample for a predetermined-time using the electrodes; the pre-bias voltage being less than the coercive field of the ferroelectric material; and
   after the predetermined time, applying a current-controlled poling voltage across the sample using the electrodes and a voltage source configured to sense current flowing through its terminals, to produce domain inversion in the sample according to the desired pattern of nonlinearity variation, wherein the poling voltage has a current curve that provides a sufficient amount of charge to produce a required amount of domain inversion in the pattern of nonlinearity variation.

2. A method according to claim 1, in which the pre-bias voltage is greater than 75% of the coercive field of the ferroelectric material.

3. A method according to claim 1, in which the pre-bias voltage is greater than 90% of the coercive field of the ferroelectric material.

4. A method according to claim 1, in which the pre-bias voltage is greater than 95% of the coercive field of the ferroelectric material.

5. A method according to claim 1, in which the pre-bias voltage is greater than 99% of the coercive field of the ferroelectric material.

6. A method according to claim 1, in which the predetermined time for which the pre-bias voltage is applied is in the range of 1 to 100 seconds inclusive.

7. A method according to claim 1, in which the sample has a thickness perpendicular to the faces to which the electrodes are applied in the range 150 µm to 10 mm inclusive.

8. A method according to claim 1, in which the voltages are applied using a current-controlled high voltage power supply, and a resistor is arranged in parallel to the sample.

9. A method according to claim 8, in which the resistor has a resistance of at least 1 MΩ.

10. A method according to claim 8, in which the current-controlled high voltage power supply is programmed to deliver current during the application of the poling voltage according to a poling curve that provides a sufficient amount of charge to produce a required amount of domain inversion.

11. A method according to claim 10, in which the poling curve is configured to correct for current flowing through the resistor.

12. Apparatus configured to implement a method according to claim 1.

13. Apparatus for inducing a periodic variation of nonlinearity value in a sample of ferroelectric material, comprising:
   a voltage source operable to apply a pre-bias voltage across the sample for a predetermined time, using a pair of electrodes arranged on opposite faces of the sample with one electrode defining a desired pattern of nonlinearity variation, the pre-bias voltage being less than the coercive field of the ferroelectric material; and,
   a voltage source configured to sense current flowing through terminals thereof and operable to apply a current-controlled poling voltage across the sample after the predetermined time, using the electrodes, to produce domain inversion in the sample according to the desired pattern of nonlinearity variation, wherein the poling voltage has a current curve that provides a sufficient amount of charge to produce a required amount of domain inversion in the pattern of nonlinearity variation.

14. Apparatus according to claim 13, in which the pre-bias voltage is greater than 75% of the coercive field of the ferroelectric material.

15. Apparatus according to claim 13, in which the pre-bias voltage is greater than 90% of the coercive field of the ferroelectric material.

16. Apparatus according to claim 13, in which the pre-bias voltage is greater than 95% of the coercive field of the ferroelectric material.

17. Apparatus according to claim 13, in which the pre-bias voltage is greater than 99% of the coercive field of the ferroelectric material.

18. Apparatus according to claim 13, in which the pre-bias voltage is applied for a predetermined time in the range of 1 to 100 seconds inclusive.

19. Apparatus according to claim 13, comprising:
   a single current-controlled high voltage power supply operable to apply the pre-bias voltage and the poling voltage, and programmed to provide currents corresponding to the pre-bias voltage and the poling voltage; and
   a resistor arrangable in parallel to the sample.

20. Apparatus according to claim 19, in which the resistor has a resistance of at least 1 MΩ.

21. Apparatus according to claim 19, in which the current-controlled high voltage power supply is programmed to deliver current during the application of the poling voltage according to a poling curve that provides a sufficient amount of charge to produce a required amount of domain inversion.

22. Apparatus according to claim 21, in which the poling curve is configured to correct for current flowing through the resistor.

* * * * *